INVENTOR
Carl H. Nordell

Nov. 28, 1967     C. H. NORDELL     3,355,022
FILTERING APPARATUS
Filed Aug. 19, 1965     2 Sheets-Sheet 2
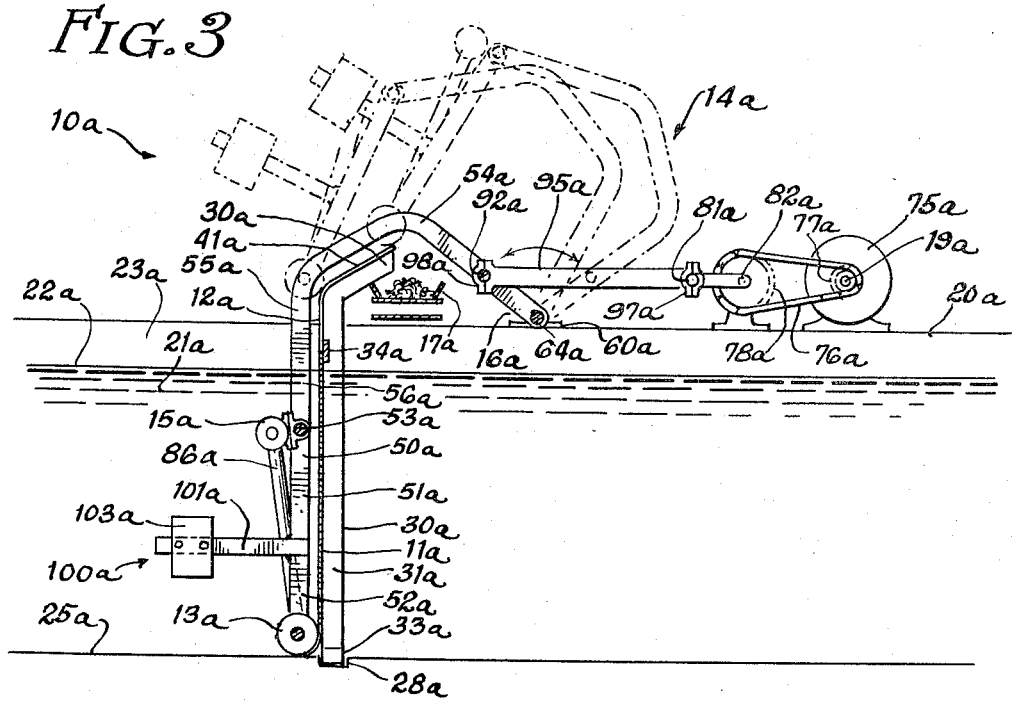
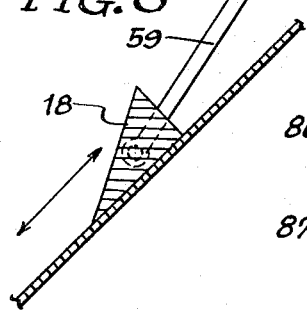
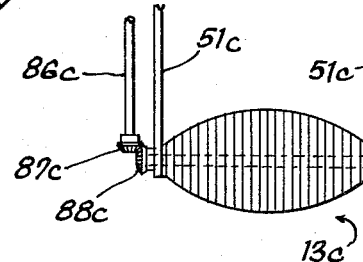
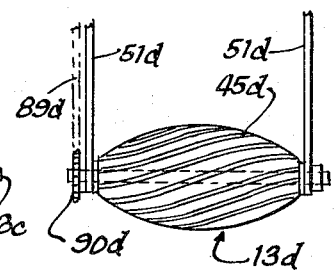
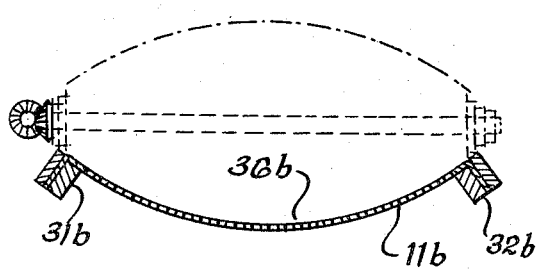
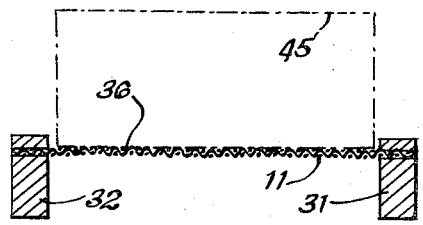
INVENTOR
Carl H. Nordell
by Horton, Davis,
Brewer & Brugman
Attys

United States Patent Office 3,355,022
Patented Nov. 28, 1967

3,355,022
FILTERING APPARATUS
Carl H. Nordell, Crystal Bay, Lake Tahoe, Nev. 89402
Filed Aug. 19, 1965, Ser. No. 481,033
6 Claims. (Cl. 210—162)

This invention relates generally to screening and straining apparatus for filtering suspended matter from a stream of flowing water or other liquid. It is particularly directed to apparatus for disengaging, collecting and removing solids intercepted by a screening means associated with the filtering apparatus.

Water drawn from lakes, rivers, streams and other bodies of water frequently contains suspended and entrained matter. Such matter, if not removed, would make impossible the use of such water for industrial and domestic purposes, such as, for example, by a power plant or other facilities requiring water without entrained solids therein. It is therefore necessary to remove suspended and entrained solids therefrom before the water enters the facility in which it is to be used.

The screening means of filtering apparatus are normally positioned in the water to be treated to confront the entire stream of water, thereby to intercept the suspended matter in the water as it passes through the screen. As the water passes through the screening means the suspended solids which are larger than the openings or passageways defined by the screening means is intercepted by and retained on the upstream face of the screening means. Matter accumulated in this manner on the screening means must be removed lest it block the passage of the water therethrough. The effectiveness of the filtering apparatus and the screening means thereof is measured by its ability to intercept the matter to be removed and by its ability to allow the water to flow through it with the least possible pressure drop.

The screening means used in filtering apparatus are of two general types. One of these is relatively movable, while the other is relatively fixed with respect to the stream of flowing water. The relatively movable type of screening means is exemplified by the movable continuous chain screening means which is cleaned as consecutive loaded portions thereof are moved upward out of the stream to a position where the accumulated matter is removed. The cleaned portion of the movable screening means is then returned to a filtering position within the stream of water.

The relatively fixed type of screening means is generally positioned in a predetermined relationship to the flowing stream of water with a top portion thereof extending above the stream surface. The matter which accumulates on the fixed screening means is removed periodically, as by raking it to the top of the screen and above the stream surface. It is then removed from the top of the screen and transferred to a suitable disposal means, such as a receptacle or conveyor. It is with this latter type of screening means, i.e., the relatively fixed screen, with which this invention is concerned.

Screening means of the generally fixed type are usually positioned in a flowing stream of water to confront substantially the entire flow at the upstream side or face of the screen. If the screening means is in a channel, such as an artificially constructed elongated channel of generally U-shaped transverse cross-section, the screen usually extends from the bottom of the channel to above the surface of the flowing stream and between the sides of the channel. The screening means may be positioned vertically or may be inclined upwardly and rearwardly with respect to the direction of flow. The selection of a particular screening means and of a particular screen orientation with respect to the direction of flow is determined by a plurality of factors, such as the stream velocity, the size of the stream, the character of the matter which is to be removed, among other things.

When screening means of the generally fixed type used with filtering apparatus are positioned in a channel in the manner described, the intercepted matter on the upstream face of the screening means is usually removed by a screen cleaning means which traverses the screening means from its lowermost to its uppermost portions, such as by a wiping or raking action. It is then necessary to remove the collected matter from the uppermost portion of the screen, which is quite difficult where a screen is steeply inclined and disposal means may not be positioned directly below the upper edge of the screen because of the angle of inclination of the screen. It is not uncommon for a portion of the collected matter to fall over the top of a steeply inclined or vertical screen into the liquid at the downstream side thereof, thereby reintroducing into the treated liquid undesired solids.

It is therefore an object of this invention to provide versatile filtering apparatus having a screen to be positioned in a stream of flowing liquid in which said screen may be effectively cleaned when disposed in vertical and inclined filtering positions within the stream.

Another object of this invention is to provide novel cleaning apparatus for removing and disposing of matter accumulated on the screen of a filtering apparatus which screen is positioned in a flowing stream of liquid to intercept undesired solids.

Yet another object of this invention is to provide novel screen cleaning means for filtering apparatus having a screen positioned in a flowing stream of liquid, in which said screen cleaning means includes a wiper means positively urged against and along the upstream face of said screen from the lowermost portion to the uppermost portion thereof, and then angularly away from the upstream face of said screen in a downstream direction.

A further object of this invention is to provide novel filtering apparatus to remove undesired solids from a stream of flowing liquid in which means are provided for urging a screen clearing wiper means into predetermined pressure contact with the upstream face of a screen from the bottom of said screen to the top of said screen.

A further object of this invention is to provide novel filtering apparatus including a filtering screen positioned in a flowing stream of liquid, screen clearing means movable along the upstream face of said filtering screen from a position adjacent the lowermost portion of said screen to a position adjacent the uppermost portion of said screen, and means for moving said screen clearing means, in which said means for moving said screen clearing means moves upwardly a distance substantially less than the length of travel imparted to the screen clearing means.

Yet another object of this invention is to provide filtering apparatus including a screen for removing undesired matter from a stream of flowing liquid in which undesired matter intercepted by said screen is dislodged and collected by rotating wiper means urged against and into line contact with the upstream face of said screen, said wiper means being rotated in a direction generally upwardly at its line of contact with said upstream face of said screen.

Yet another object of this invention is to provide in a fluid filtering apparatus having a screen, a rotatable wiper means having an elongated rubber-like body portion movable along said screen, said body portion defining transversely to the upstream face of said screen a contour conforming to said upstream face, and means for rotatably moving said rotatable wiper means about its longitudinal axis to wipe said face of said screen as said wiper means is moved along said face.

These and further objects and advantages will become apparent from the following description and drawings of which:

FIG. 3 is a side sectional view similar to FIG. 1 of a further embodiment of this invention;

FIG. 4 is an enlarged fragmentary view of a screen clearing means adapted for use with a curved screen;

FIG. 5 is an enlarged fragmentary view of a further screen clearing means adapted for use with a curved screen;

FIG. 6 is a fragmentary view of a further screen clearing means adapted for use with the apparatus of FIG. 1;

FIG. 7 is a transverse section of a curved screen showing in phantom a wiper of FIG. 4 or FIG. 5 in cleaning engagement with the screen, and FIG. 8 is a partial transverse section of FIG. 1 showing the wiper of FIG. 1 in phantom.

Figure 1:
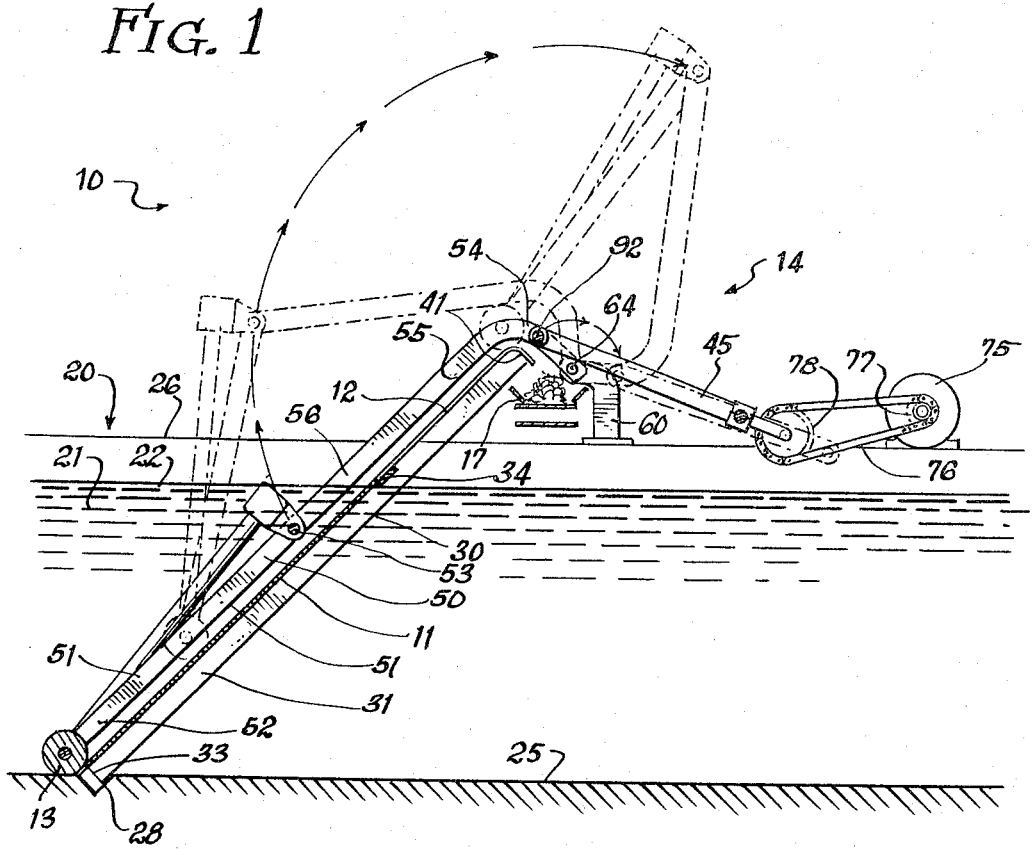
FIGURE 1 is a side sectional view of a filtering apparatus of this invention taken substantially along line 1—1 of FIG. 2.
Figure 2:
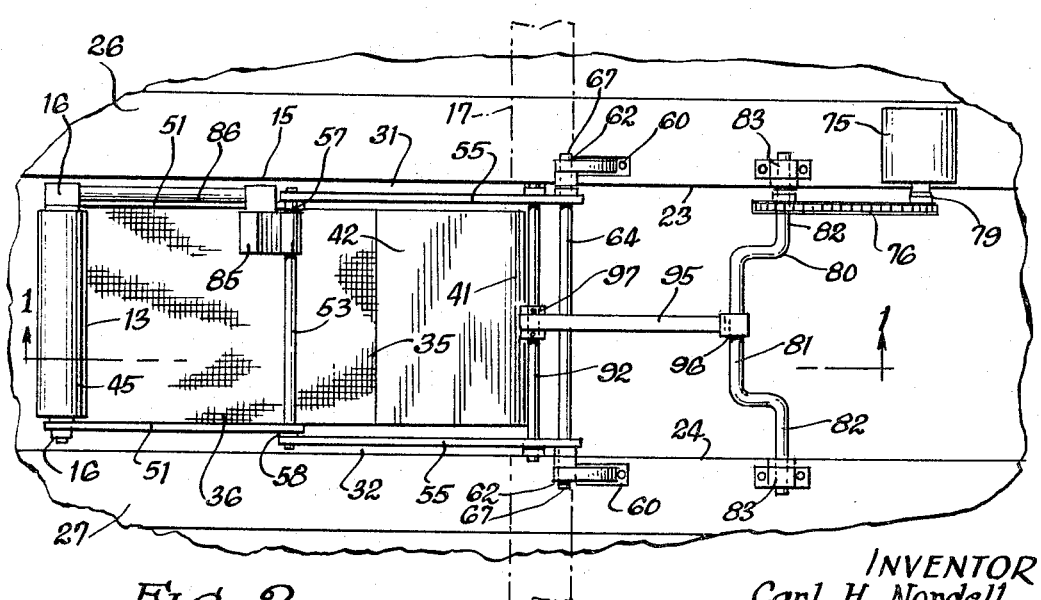
FIG. 2 is a plan view of the apparatus of FIG. 1.

First referring to FIGS. 1 and 2, a filtering apparatus 10 of this invention is shown in an operative position in a stream-containing means, such as a channel 20. As seen in FIG. 1, the stream of water 21 contained by channel 20 is moving from left to right, from upstream to downstream.

Channel 20 is elongated and general U-shaped in transverse cross-section and comprises a generally horizontal floor 25 and spaced side walls 23 and 24 extending generally vertically upward from floor 25. Side walls 23 and 24 terminate in upper edges 26 and 27, respectively. Upper edges 26 and 27 are positioned well above the surface 22 of the stream 21 and may coincide with banks adjacent the channel sides. While stream 21 may move through channel 20 as a result of natural currents, where necessary or desirable head producing means suitable to provide a predetermined volume of filterable water may be provided.

Filtering apparatus 10 includes a screen 11 positioned in channel 20 to confront the entire stream 21. Screen 11 extends across channel 20 and its plane intersects side walls 23 and 24 generally at right angles. As shown in FIG. 1 screen 11 is inclined upwardly and rearwardly with respect to the direction of flow of stream 21. Screen 11 is of the generally fixed type previously described and is adapted to intercept and retain undesired matter from the stream 21 which passes therethrough.

As shown in FIGS. 1 and 8, screen 11 is a mesh screen which is substantially flat. It defines a generally planner upstream face 36. However, the particular screen used with a given filtering apparatus 10 and a given stream is determined by the character of the undesired matter which the screen is to intercept, among other things, and may be of a bar, ribbon or perforated sheet construction, as well as the mesh construction illustrated.

Screen 11 is fixedly attached at its perimeter to a frame 30, as by suitable nut and bolt means. Frame 30 is positioned in channel 20 to support and maintain screen 11 in the inclined position shown. Frame 30 defines a generally rectangular screen supporting portion which includes inclined side rails 31 and 32, a bottom rail 33 and a top rail 34, all secured to each other in any suitabe manner, such as by welding. Frame 30 is secured to the channel as at its side rails 31 and 32 by suitable anchoring means. A recess 28 is provided in floor 25 to receive and position frame 30 in the channel adjacent bottom rail 33. Top rail 34, as seen in FIG. 1, is positioned well above surface 22 of stream 21 and is located intermediate the upper and lower extremities of side rails 31 and 32. Side rails 31 and 32 extend upwardly to an elevation well above stream 21 and above top rail 34.

As seen in FIG. 1, screen 11 extends upwardly above the surface 22 of stream 21. Adjacent the uppermost edge of screen 11, a solids receiving means, such as plate 12 is provided. Plate 12 includes a flat lower portion 42, the lowermost edge of which abuts and coincides with the uppermost edge of screen 11. Plate 12 is secured to top rail 34 as well as to side rails 31 and 32 as by suitable nut and bolt means. The transverse contours and widths of screen 11 and plate 12 are substantially the same.

At an upper portion 41 of plate 12, plate 12 is curvedly bent rearwardly and in a downstream direction away from lower portion 42. The surface of upper portion 41 is at an angle to the surface of the upstream face 36 of screen 11 and similarly at an angle to lower portion 42 of plate 12. As such, upper portion 41 terminates downstream of screen 11 and well above surface 22 of stream 21 to permit the positioning of disposal means 17, such as a conveyor or conveyor belt, directly therebeneath.

To remove intercepted and accumulated matter from the upstream face of screen 11, a screen clearing means is provided. The screen clearing means illustrated in FIGS. 1 and 2 includes a screen contacting and clearing member, such as wiper 13, and means for cyclically moving wiper 13 from the lowermost portion of the screen to upper portion 41 of plate 12.

The means for moving the wiper 13 is shown in FIGS. 1 and 2 and includes a reciprocating means 14. Reciprocating means 14 comprises a lower link means, an upper link means, a fixed pivoting means and a drive means to oscillate the upper link means about the fixed pivoting means in a manner to be described.

The lower link means includes spaced elongated parallel arms 51 having lower ends 52 and upper ends 50. The lower ends 52 define openings through which the ends of a wiper shaft means 16 extend. In that manner lower ends 52 provide bearing means for the wiper shaft means 16. The upper ends 50 of arms 51 are secured as by welding to a cylindrical shaft 53. Shaft 53 assists in maintaining the parallel spaced relationship between arms 51.

The upper link means comprises a pair of elongated spaced parallel arm members 55 having lower ends 56 and upper ends 54. Arm members 55, adjacent their lower ends 56, define generally circular openings adapted to receive the ends of cylindrical shaft 53 and are of a dimension slightly larger than shaft 53 to permit relative rotation of shaft 53 and lower ends 56. Lower ends 56 are positioned to be substantially immovable axially of shaft 53 in any suitable manner such as by cotter pin means connected to shaft 53.

At upper ends 54 arm members 55 are interconnected as by axle means 64. Axle means 64 extend through suitable openings in upper ends 54, and arm members 55 are secured in their spaced parallel relationship to axle means 64 as by welding. Axle segments 67, at each end of axle means 64, are oscillatably supported on a fixed pivoting means. The fixed pivoting means include a pair of concentrically arranged stationary bearing means 62 which receive axle segments 67. Each bearing means is supported upon an upstanding L-shaped leg 60 secured at its lower end, as by bolt means, to the upper edges 26 and 27 of side walls 23 and 24.

Intermediate the upper and lower ends of arm members 55 a drive bar 92 is provided. Drive bar 92 is fixedly connected to each arm member 55 as by welding. It is possible, where desired, to move the position of the drive bar from that shown in FIG. 1 to some other position along the length of arm members 55 to adjust the range of movement of wiper 13. While drive bar 92 is shown and described as being fixedly secured to arm members 55 it may also be releasably connected to arm members 55 as by nut and bolt means used with cooperable openings in arm members 55.

The drive means serves to oscillate the upper link means about the fixed pivoting means to move wiper 13 along screen 11 and plate 12. The drive means includes a prime mover 75 having a rotatable output shaft 19 to which is connected a drive sprocket 77. Prime mover 75 may be an electrical motor energizable from a suitable power source. Drive sprocket 77 drivingly engages a drive chain 76 which is drivingly interconnected with a sprocket 78. Sprocket 78 is corotatably secured to a crank shaft 80. Crank shaft 80 at its ends 82 is rotatably journalled in journal brackets 83. Journal brackets 83 are secured as by bolts means to the upper edges 26 and 27 of side walls 23 and 24. Intermediate ends 82 of crank shaft 80 an offset crank arm portion 81 is provided. The degree of offset of crank arm portion 81 is determined by the relative position of drive bar 92 and the distance which the wiper 13 is intended to move along screen 11 and plate 12.

A connecting rod 95 having journals 96 and 97 secured at its respective opposite ends is provided to interconnect drive bar 92 and offset crank arm portion 81 of crank shaft 80. Journal 96 at one end of connecting rod 95 rotatably receives offset crank arm portion 81, and journal 97 at the other end of connecting rod 95 surrounds and receives drive bar 92 for oscillatory or rotational movement of drive bar 92 with respect to journal 97.

As mentioned, wiper 13 is rotatably supported at lower ends 52 of arms 51 upon wiper shaft means 16. It will be noted that the axes of wiper shaft means 16, of crank shaft 80, of axle means 64, of drive bar 92, and of shaft 53 are parallel. As seen in FIG. 2, wiper 13 includes a rotatable screen clearing member such as cylindrical roller portion 45 which is concentric with and corotatably secured to wiper shaft means 16. The surface of roller portion 45 as shown is fabricated of rubber, although the material used will vary with the use to which filtering apparatus 10 will be put.

Wiper 13 is adapted to be rotated as it moves along screen 11. By the means to be described, cylindrical roller portion 45 is rotated in a direction contrary to the direction in which it would rotate if it was permitted to simply roll along screen 11 as it traverses screen 11 and plate 12 from floor 25 to upper portion 41. As such at the line of contact between the upstream face 36 of screen 11 and roller portion 45, roller portion 45 is rotated in a direction generally upwardly. Thus, as viewed in FIG. 1, cylindrical roller portion 45 is rotated in a counterclockwise direction. Cylindrical roller portion 45 may be rotated during its entire reciprocal traverse of screen 11 and plate 12, or it may be rotated only on its upward movement therealong, and permitted to roll freely along plate 12 and screen 11 on its downward traverse thereof.

The means for rotating of wiper 13 includes a submersible prime mover 85 fixedly secured to cylindrical shaft 53 and an arm 51. Submersible prime mover 85 is provided with suitable output shaft and gear means for rotating drive shaft 86. Submersible prime mover 85 may be an electrical motor powered by a suitable electrical power source (not shown). Drive shaft 86 is provided with a corotatable bevel gear 87. Bevel gear 87 meshes with wiper shaft means bevel gear 88 which is corotatably secured to wiper shaft means 16. Thus, as drive shaft 86 is rotated, wiper shaft means 16 will rotate wiper 13.

While bevel gear means have been described and illustrated, other suitable driving means for rotating wiper 13 may be employed. For example, as shown in FIG. 5, pulley and belt means may be used.

In use, the filtering apparatus of FIGS. 1 and 2 is positioned in the manner described in channel 20. When so positioned, the upstream face 36 of screen 11 confronts substantially the entire stream 21. As stream 21 passes through screen 11, the solids and matter which screen 11 is intended to intercept and collect are retained upon upstream face 36.

The screen cleaning means is operated periodically. The frequency of its operation is dependent upon the rate and volume of flow of stream 21 and the quantity and nature of the solids and matter to be intercepted by and retained upon upstream face 36.

During the cycle of operation of the screen cleaning means, wiper 13 is rotated in the direction previously indicated by submersible prime mover 85. While so rotating, wiper 13 is moved along and against face 36 from a position adjacent the floor of channel 20 to and along the upper portion 41 of plate 12 by reciprocating means 14.

To cause wiper 13 to traverse screen 11 and plate 12 in that fashion, prime mover 75 is energized to rotate crank shaft 80 within its journal brackets 83. As crank shaft 80 rotates it moves connecting rod 95, to which it is journalled, and causes arm members 55 of the upper link means to oscillate about the axis of axle means 64. As best seen in FIG. 1, arm members 55 are oscillated with respect to bearing means 62, the lower ends 56 are moved upwardly and away from the screen. This upward movement of lower ends 56 pivotally draws the upper ends 50 of arms 51 upwardly therewith to move wiper 13 along the upstream face 36 of screen 11 and then along plate 12. The weight of the reciprocating means, and particularly of wiper 13, arms 51 and the associated submersible prime mover 85 biases wiper 13 and its cylindrical roller portion 45 against face 36 and plate 12. Where the weight of those members is insufficient to provide a desired biasing force, or where the disposition of arm members 55 and arms 51 in some positions are inappropriate for exerting a biasing force against screen 11 and plate 12, supplemental biasing means such as weights, springs and the like may be used to urge wiper 13 into suitable pressure contact with screen 11 and plate 12.

Several of the positions which wiper 13 assumes as it traverses screen 11 and plate 12 in its movement from the channel floor 25 to upper portion 41 of plate 12 are shown in phantom in FIG. 1. As there shown, when wiper 13 reaches the uppermost portion of screen 11 it moves into contact with the lower portion 42 of plate 12 and thereafter continues to move in pressure contact therewith until it reaches upper portion 41. At that point the solids accumulated by screen 11 and collected by wiper 13 are dropped into the underlying disposal means 17. Thereafter wiper 13 is returned to a position adjacent floor 25 during the return portion of the cycle of movement of crank shaft 80 to ready wiper 13 for a further cycle of operation. In this embodiment, prime mover 85 is operated only during the upward movement of wiper 13 and is not driven during the return portion of the cycle.

FIGURE 3 illustrates a further embodiment of this invention. In FIG. 3 a flat screen 11a of filtering apparatus 10a is disposed in a channel 20a in a vertical position rather than in the inclined position of FIG. 1. Channel 20a is of substantially the same contour as channel 20.

Screen 11a is positioned in channel 20a to confront the entire stream of water 21a. Screen 11a extends across channel 20a and its plane intersects the side walls of the channel and the floor of the channel generally at right angles. Screen 11a is of the generally fixed type and is adapted to intercept and retain undesired matter from the stream 21a which passes therethrough.

As shown in FIG. 3, screen 11a is a mesh screen defining a generally planar upstream face 36a. However it may be of a bar, ribbon, perforated sheet or other constructions, as well as the mesh construction illustrated. The construction used depends upon the character of the undesired matter which screen 11a is intended to intercept, among other things.

Screen 11a is fixedly attached at its perimeter to a frame 30a, as by suitable nut and bolt means. Frame 30a is similar in character to frame 30 except that the side rails 31a thereof have an angled upper portion 35a. Frame 30a is suitably anchored in channel 20 to resist relative movement with respect to stream 21a. The bottom of frame 30a is received in a recess 28a in floor 25a of channel 20a to assist in positioning frame 30a in the channel. The upper portion of the side rails extend well above the surface 22a of stream 21a. Intermediate the extremities of the side rails a top rail 34a is provided to to position and retain the upper edge of screen 11a and the lower edge of a plate 12a.

As seen in FIG. 3, screen 11a extends upwardly above the surface 22a of stream 21a. Adjacent the uppermost edge of screen 11a, a solids receiving means such as plate 12a is provided. Plate 12a and screen 11a are secured to top rail 34a as well as to the side rails, as by suitable nut and bolt means. The transverse contours and width of screen 11a and plate 12a are substantially the same.

At an upper portion 41a of plate 12a, plate 12a is curvedly bent rearwardly and in a downstream direction away from lower portion 42a thereof. Upper portion 41a terminates downstream of screen 11a and well above the surface 22a of stream 21a to permit the positioning of disposal means 17a, such as a conveyor or conveyor belt directly therebeneath.

A screen cleaning means similar to that shown in FIGS. 1 and 2 is provided. The screen cleaning means includes a screen clearing means such as wiper 13a and means for cyclically moving wiper 13a from the lowermost portion of the screen to the upper portion 41a of plate 12a. The means for cyclically moving wiper 13a includes a reciprocating means 14a. As in the embodiment of FIGS. 1 and 2, reciprocating means 14a comprises a lower link means, an upper link means, a fixed pivoting means and a drive means to oscillate the upper link means about the fixed pivoting means.

The lower link means includes spaced elongated parallel arms 51a having lower ends 52a and upper ends 50a. The lower ends 52a define openings through which the ends of a wiper shaft means 16a extend. In that manner lower ends 52a provide a bearing means for the wiper shaft means 16a. The upper ends 50a of arms 51a are secured as by welding to a cylindrical shaft 53a. Shaft 53a serves to maintain the parallel spaced relationship between arms 51a.

The upper link means comprises a pair of generally U-shaped spaced parallel arm members 55a having lower ends 56a and upper ends 54a. Arm members 55a, adjacent their lower ends 56a, define generally circular openings adapted to receive the ends of cylindrical shaft 53a and are of a dimension slightly larger than shaft 53a to permit relative rotation of shaft 53a and lower ends 56a. Lower ends 56a are positioned to be substantially immovable axially of shaft 53a in any suitable manner, such as by cotter pin means connected to cylindrical shaft 53a.

At upper ends 54a arm members 55a are interconnected as by axle means 64a. Axle means 64a extend through suitable openings in ends 54a and arms members 55a are secured in their spaced parallel relationship to axle means 64a as by welding. Axle segments 67a, similar to axle segments 67 of axle means 64, are oscillatably supported on the fixed pivoting means. The fixed pivoting means includes stationary bearing means similar to bearing means 62 which oscillatably receive axle segments 67a. The bearing means is supported upon a support plate 60a secured, as by bolt means, to the upper edges of the side walls of channel 20a.

Intermediate the upper and lower ends of arm members 55a a drive bar 92a similar to drive bar 92 is provided. Drive bar 92a is fixedly connected to each arm member 55a as by welding. It may be otherwise positioned in a manner similar to that described in connection with the embodiment of FIGS. 1 and 2.

The drive means serves to oscillate the upper link means about the pivoting means to move wiper 13a along screen 11a and plate 12a. The drive means includes a prime mover 75a having a rotatable output shaft 19a to which is connected a drive sprocket 77a. Prime mover 75a may be an electrical motor energized from a suitable power source. Drive sprocket 77a drivingly engages a drive chain 76a which is drivingly interconnected with a sprocket 78a. Sprocket 78a is corotatably secured to a crank shaft 80a similar in configuration to crank shaft 80. Crank shaft 80a is rotatably journalled in a manner similar to crank shaft 80 and is provided with an offset crank arm portion 81a, the degree of offset being determined by the relative position of drive bar 92a and the distance which wiper 13a is intended to move along screen 11a and plate 12a.

A connecting rod 95a is provided with journals 96a and 97a at its opposite ends by which connecting rod 95a is interconnected with drive bar 92a and offset crank arm portion 81a. Journals 96a and 97a are proportioned to permit relative rotation of the journals with respect to crank arm portion 81a and drive bar 92a.

Wiper 13a is rotatably supported at lower ends 52a of arms 51a upon wiper shaft means 16a. Wiper 13a includes a cylindrical roller portion 45a which is concentric with and corotatably secured to wiper shaft means 16a.

Wiper 13a is adapted to be rotated as it moves along screen 11a in the same direction and in the same manner as wiper 13 of FIGS. 1 and 2. Thus, as viewed in FIG. 3 wiper 13a is rotatable in a counterclockwise direction by means the same as those shown and described in connection with FIGS. 1 and 2.

To bias wiper 13a against the upstream face 36a of screen 11a, a biasing means 100a is providing. Biasing means 100a comprises arms 101a secured, as by welding, to arms 51a, and weight means 103a. Weight means 103a are secured in any suitable manner to arms 101a to exert a downward force against upstream portions of arms 101a. In that manner biasing means 100a urges wiper 13a into pressure contact with upstream face 36a of screen 11a and with plate 12a. The means for securing weight means 103a to arms 101a may be adjustable along the length of arms 101a by providing slots in arms 101a through which threaded ends of a weight rod 102a may extend for reception of lock nuts. That also permits the addition and subtraction of weights to vary the weight of weight means 103a.

The manner of operation of the filtering apparatus of FIG. 3 is substantially the same as that described in connection with FIG. 1. In addition to the full line position of the scavenging means shown in FIG. 3, several additional views in phantom are provided to show other positions of wiper 13 and reciprocating means 14 during a cycle of operation. It will be noted that biasing means 100a through the range of movement of wiper 13a maintains wiper 13a in pressure contact with screen 11a and plate 12a.

FIGS. 4, 5 and 7 illustrate further embodiments of this invention and the manner in which the filtering apparatus of the embodiments of FIGS. 1 and 3 may be adapted to an arcuate screen.

FIG. 7 shows a screen 11b, arcuate in transverse cross-section, which may be used instead of the generally planar upstream face defining screens of FIGS. 1 and 3. Screen 11b is secured to a frame which, like frame 30, includes suitable screen retaining side rails 31b and 32b. Instead of the cylindrical outer contour of cylindrical roller portion 45, the screen clearing means of FIG. 7 defines an arcuate roller portion complementary in contour to the upstream face 36b of arcuate screen 11b. Suitable wiping or screen clearing means with arcuate screen 11b are shown in FIGS. 4 and 5.

As seen in FIG. 4 a wiper 13c is constructed of a plurality of rubber discs perpendicular to the axis of a wiper shaft means 16c. Wiper shaft means 16c is journalled on arms 51c in the manner described in connection with the embodiment of FIG. 1. Wiper 13c is rotated on arms 51c through a wiper shaft bevel gear 88c corotatably secured thereto. Bevel gear 88c meshes with a further bevel gear 87c which is corotatably secured to a drive shaft 86c driven in the manner described in connection with the drive shaft 86 of FIG. 1.

As seen in FIG. 5, wiper 13d includes an outer roller portion 45d complementary to an arcuate screen, such as screen 11b. Roller portion 45d provides a rubber outer surface defining helical ribs, helical with respect to the axis of rotation of wiper 13d. Wiper 13d includes a wiper shaft means 16d with which arcuate roller portion 45d is corotatable. Wiper shaft means 16d is rotatably journalled at the ends of arms 51d. A drive pulley 90d is corotatably secured to wiper shaft means 16d. It is driven by a belt 89d from a submersible prime mover (not shown) such as that of FIG. 1. Instead of the bevel gear means described in connection with FIGS. 1 and 3, the output shaft of the submersible prime mover is provided with suitable drive means including a pulley for rotating belt 89d.

A further screen clearing means usable with the filtering apparatus of this invention is shown in FIG. 6. As there shown, the wiper means includes a nonrotatable member 18 of a construction like that shown in my prior patent, U.S. Patent No. 2,839,197. Wiper 18 is secured to an axle means 15 which extends between parallel arms 59 similar to arms 51 of FIG. 1. Wiper 18 defines an opening therethrough to receive axle means 15. The opening in wiper 18 and the dimensions of axle means 15 are such that the necessary oscillatory movement of wiper 18 with respect to axle means 15 is provided for during the movement of wiper 18 from the bottom of screen 11e to the top of a plate (not shown) as by the reciprocating means shown in FIG. 1.

It is to be noted, particularly in FIGS. 1 and 3, that the headroom required for the driving means for wipers 13 and 13a is substantially less than that which would be required if the means for moving the wiper along the screen were a simple straight reciprocatory member such as that illustrated in U.S. Patent No. 2,839,197. As illustrated by FIGS. 1 and 3, the reciprocating means 14 and 14a are proportioned so that the headroom required considerably less than that which would be required with a straight reciprocating means. The headroom requirement of the embodiments illustrated is as little as about 70% of that which would be required by a conventional straight reciprocating means. In many environments where filtering apparatus of the type described herein are used, headroom is limited. Because less headroom is required, fixed screen types of filtering apparatus may be used in many places where it was not possible to use them previously.

While I have described several embodiments of the present invention, it will be apparent to those of ordinary skill in the art that modifications may be made therein wtihout departing from the spirit and scope of this invention.

I claim:

1. In filtering apparatus for removing undesired solids from a flowing stream of filterable liquid comprising: a screening means extending upwardly from the bottom of said stream to an upper edge above the surface of said stream, means for supporting and positioning said screening means in said stream whereat the upstream face of said screening means confronts substantially the entire stream, said screening means being adapted to intercept and remove solids from said stream; screen clearing means; reciprocating means for supportably positioning and moving said screen clearing means along and against said upstream face from the bottom of said stream to said upper edge of said screening means for collecting solids intercepted by said screening means, said reciprocating means comprising an upper link means and a lower link means pivotally interconnected at one end of each link means, pivoting means pivotally supporting the end of said upper link means remote from said lower link means, means connecting said screen clearing means to the end of said lower link means remote from said upper link means, and drive means for oscillating said upper link means about said pivoting means, whereby as said upper link means is oscillated about said pivoting means, said screen clearing means is moved from a first position adjacent the bottom of said stream along and against the upstream face of said screening means to a second position at which said screen clearing means is adjacent the upper edge of said screening means, said remote ends of said upper and lower link means being drawn toward one another as said upper link means is moved from said first position to said second position.

2. Filtering apparatus for removing undesired solids from a flowing stream of filterable liquid comprising a frame means; a screening means secured to and supported by said frame means, said screening means comprising a screen portion supportably positioned in said flowing stream by said frame means and defining an upstream face confronting said flowing stream for intercepting and removing solids therefrom, said screen portion extending from the bottom of said stream upwardly to an upper edge above said flowing stream, and a solids receiving portion adjacent said upper edge including a rearwardly extending segment defining a surface which is at an angle to said upstream face of said screen portion, said rearwardly extending segment terminating in an edge downstream of said screen portion and above the surface of said flowing stream; screen clearing means for engaging said screening means and said solids receiving portion, reciprocating means for supportably positioning and moving said screen clearing means along and against said upstream face and said solids receiving portion from the bottom of said stream to the downstream edge of said solids receiving portion of said screening means for collecting solids intercepted by said screening means, said reciprocating means comprising an upper link means and a lower link means pivotally interconnected at one end of each link means, pivoting means fixedly positioned adjacent said solids receiving portion of said screening means for pivotally supporting the end of said upper link means remote from said lower link means, means connecting said screen clearing means to the end of said lower link means remote from said upper link means, drive means for oscillating said upper link means about said pivoting means from a first position toward said upstream face of said screening means, whereat said screen clearing means is positioned adjacent the bottom of said stream to a second position away from said upstream face, whereat said screen clearing means is positioned adjacent the downstream edge of said solids receiving portion of said screening means, said remote ends of said upper and lower link means being drawn toward one another as said upper link means is moved from said first position to said second position.

3. In filtering apparatus for removing undesired solids from a flowing stream of filterable liquid comprising: a screening means extending upwardly from the bottom of said stream to an upper edge above the surface of said stream, means for supporting and positioning said screening means in said stream whereat the upstream face of said screening means confronts substantially the entire stream, said screening means being adapted to intercept and remove solids from said stream; screen clearing means; reciprocating means for supportably positioning and moving said screen clearing means along and against said upstream face from the bottom of said stream to said upper edge of said screening means for collecting solids intercepted by said screening means, said reciprocating means comprising an upper link means and a lower link means pivotally interconnected at one end of each link means, pivoting means fixedly positioned adjacent said upper edge of said screening means for pivotally supporting the end of said upper link means remote from said lower link means, means connecting said screen clearing means to the end of said lower link means remote from said upper link means, said upper link means and said lower link means each defining an effective pivoting length substantially less than the length of travel of said screen clearing means when moved upwardly by said reciprocating means along and against said screening means from a position adjacent the bottom of said flowing stream to a position adjacent said upper edge of said screening means.

4. In filtering apparatus having a screening means for removing undesired solids from a flowing stream of filterable liquid, in which said screening means is positioned in said flowing stream to confront substantially the entire said flowing stream at its upstream face and extends upwardly from the bottom of said stream to an upper edge above the surface of said stream; screen clearing means for removing solids intercepted by and retained on said upstream face of said screening means comprising, a rotatable screen clearing member extending transversely across said upstream face of said screening means and defining an upstream face contacting surface having a longitudinal contour conforming to the transverse contour of said upstream face, said screen clearing member being formed of a yieldable elastomeric material adapted to intimately engage said upstream face of said screening means in a wiping relationship when the surface of said screen clearing member is rotated thereagainst, means rotatably supporting said screen clearing member for moving said screen clearing member reciprocally along and against said upstream face from a first position adjacent the bottom of said stream, to a second position adjacent said upper edge of said screening means, said screen clearing member defining an axis of rotation generally normal to the reciprocal movement thereof along said upstream face, and drive means for rotating said rotatable screen clearing member about said axis of rotation thereof in a direction contrary to the direction of rotation its engagement with said screening means would impart thereto as said rotatable screen clearing member is moved from said first position to said second position.

5. The invention of claim 4 in which said contacting surface of said rotatable screen clearing member bears a plurality of longitudinally extending spaced rubberlike ridges, said ridges being adapted to dislodge matter retained on said upstream face of said screening means as the screen clearing member is moved from said first position to said second position.

6. Filtering apparatus for removing undesired solids from a flowing stream of filterable liquid comprising: a frame means; a screening means secured to and supported by said frame means, said screening means comprising a screen portion supportably positioned in said flowing stream by said frame means and defining an upstream face confronting said flowing stream for intercepting and removing solids therefrom, said screen portion extending from the bottom of said stream upwardly to an upper edge above said flowing stream, and a solids receiving portion adjacent said upper edge including a rearwardly extending segment defining a surface which is at an angle to said upstream face of said screen portion, said rearwardly extending segment terminating in an edge downstream of said screen portion and above the surface of said flowing stream; screen clearing means for removing solids intercepted by and retained on said upstream face of said screen portion comprising, a rotatable screen clearing member defining a longitudinal axis of rotation arranged transversely of said screen portion and said solids receiving portion, and a surface concentric with said axis adapted for rotating contact with said upstream face and said solids receiving portion, reciprocating means for supportably positioning and moving said screen clearing means along and against said upstream face and said solids receiving portion from the bottom of said stream to the downstream edge of said solids receiving portion of said screening means for collecting solids intercepted by said screening means, said reciprocating means comprising an upper link means and a lower link means pivotally interconnected at one end of each link means, pivoting means fixedly positioned adjacent said solids receiving portion of said screening means for pivotally supporting the end of said upper link means remote from said lower link means, means rotatably connecting said rotatable screen clearing member to the end of said lower link means remote from said upper link means, drive means for oscillating said upper link means about said pivoting means from a first position toward said upstream face of said screening means, whereat said rotatable screen clearing member is positioned adjacent the bottom of said stream to a second position away from said upstream face, whereat said rotatable screen clearing member is positioned adjacent the downstream edge of said solids receiving portion of said screening means, said remote ends of said upper and lower link means being drawn toward one another as said upper link means is moved from said first position to said second position, and means for rotating said rotatable screen clearing member about said axis of rotation thereof in a direction contrary to the direction of rotation its engagement with said screening means would impart thereto as said rotatable screen clearing member is moved from said first position to said second position.

References Cited

UNITED STATES PATENTS

| 1,984,891 | 12/1934 | Miick et al. | 210—159 |
| 2,128,348 | 8/1938 | Briggs | 210—159 |
| 2,136,853 | 11/1938 | Knecht | 210—414 |
| 2,335,573 | 11/1943 | Scott | 210—159 |

FOREIGN PATENTS 201,810    8/1955    Australia.

SAMIH N. ZAHARNA, *Primary Examiner.*

F. MEDLEY, *Assistant Examiner.*